(No Model.) 3 Sheets—Sheet 1.

A. DELANEY.
MACHINE FOR MOLDING WHEELS.

No. 410,156. Patented Sept. 3, 1889.

Witnesses:
J. Thomson Cross
Will E. Rouzee

Inventor:
Alexander Delaney
per
Henry W.
Attorney.

(No Model.) 3 Sheets—Sheet 2.

A. DELANEY.
MACHINE FOR MOLDING WHEELS.

No. 410,156. Patented Sept. 3, 1889.

Witnesses:
J. Thomson Cross
Mill. E. Rouzee

Inventor:
Alexander Delaney.
per Henry Orth
Attorney.

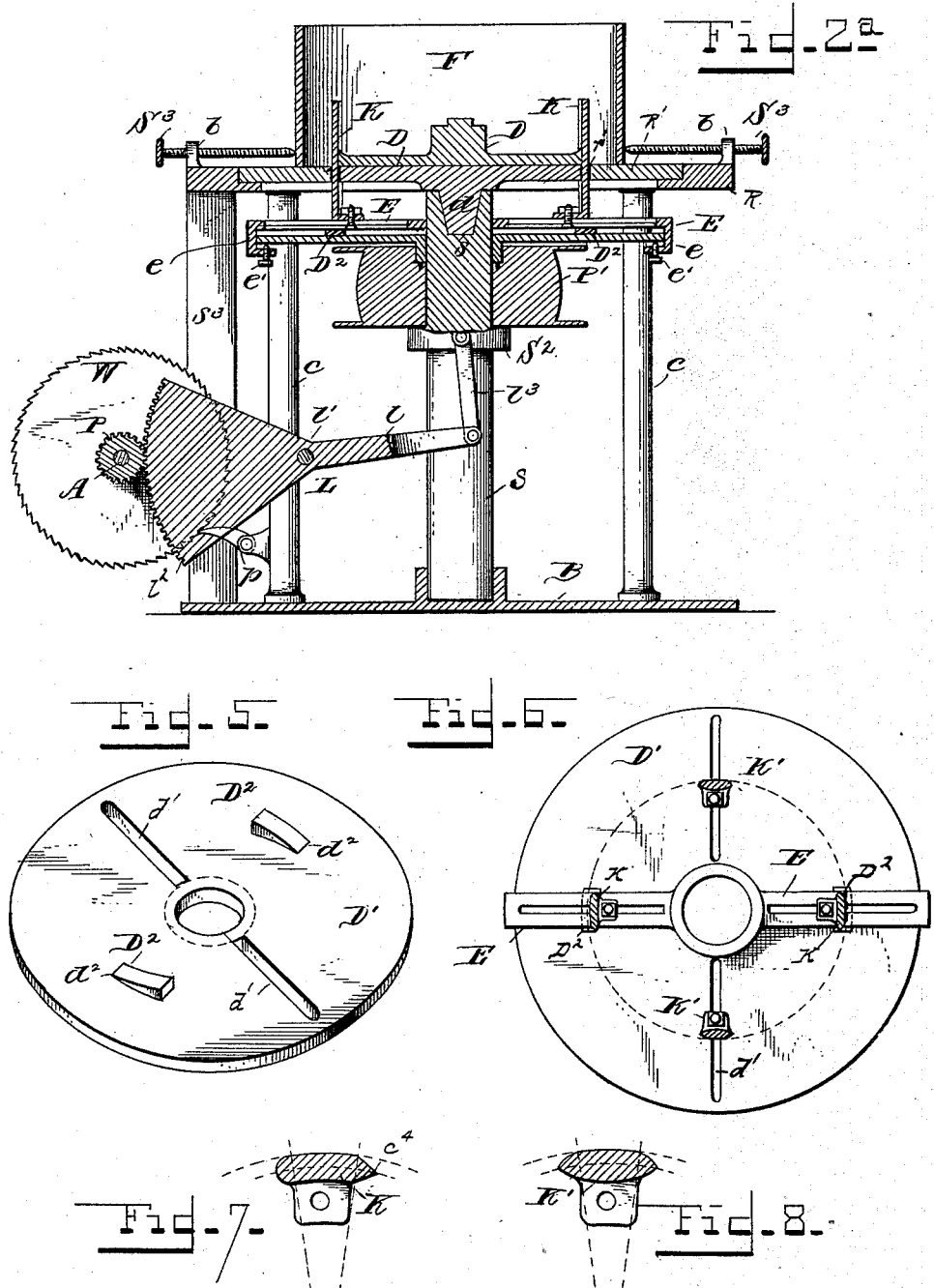

UNITED STATES PATENT OFFICE.

ALEXANDER DELANEY, OF PETERSBURG, VIRGINIA.

MACHINE FOR MOLDING WHEELS.

SPECIFICATION forming part of Letters Patent No. 410,156, dated September 3, 1889.

Application filed January 24, 1889. Serial No. 297,473. (No model.)

*To all whom it may concern:*

Be it known that I, ALEXANDER DELANEY, a citizen of the United States, residing at Petersburg, in the county of Dinwiddie and State of Virginia, have invented certain new and useful Improvements in Machines for Molding Wheels or Pulleys; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
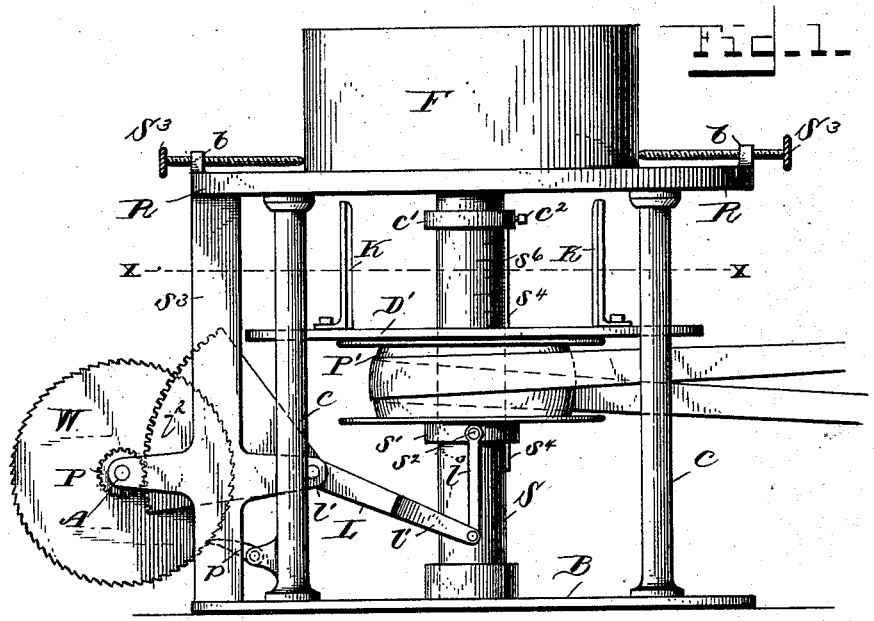
Figure 2:
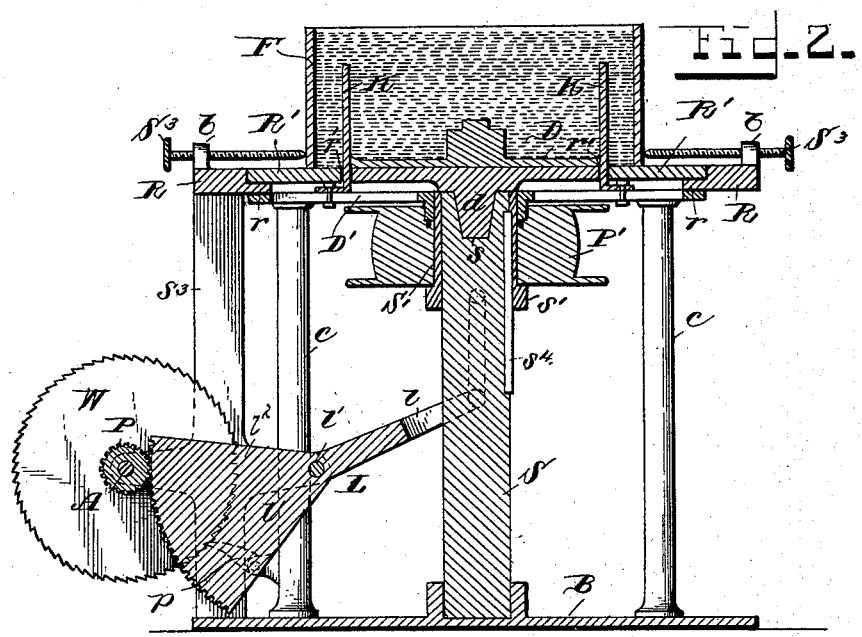
Figure 3:
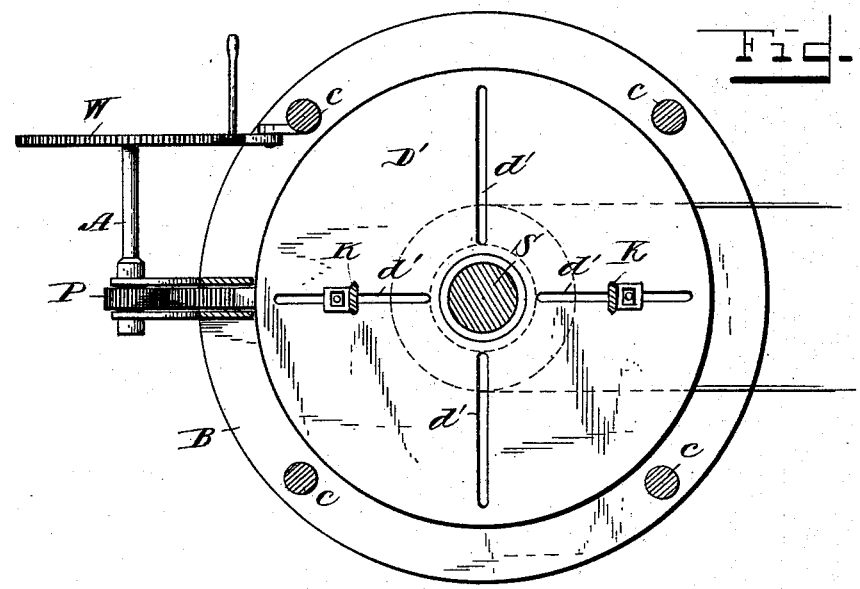
Figure 4:
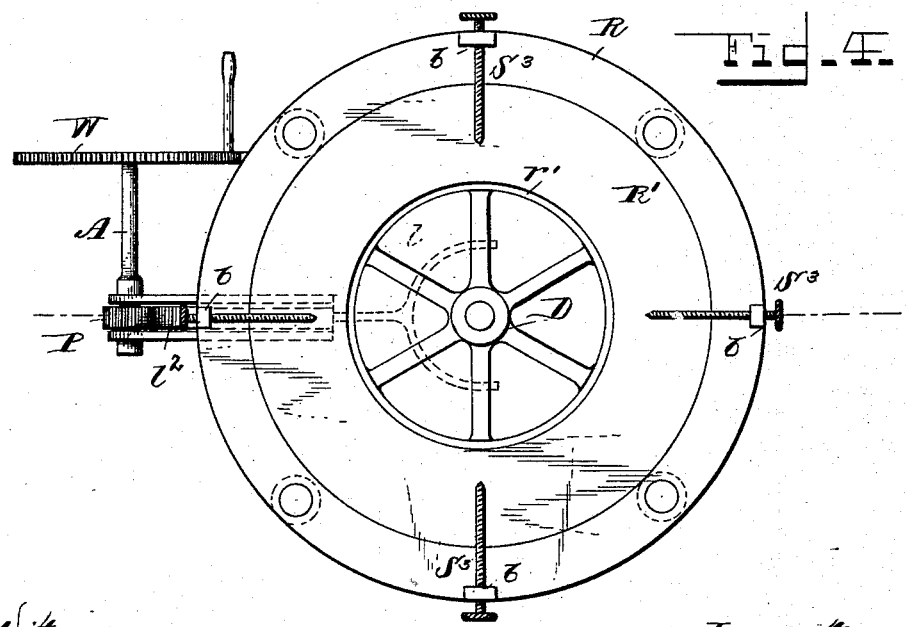

Referring to the drawings, Figure 1 is an elevation of my improved machine for molding wheels or pulleys, showing the coring-tools withdrawn from the flask. Fig. 2 is a vertical section thereof, showing the coring-tools in the act of coring out the rim for the wheel or pulley. Fig. 2ª is a like view of a modification, illustrating means for vertically adjusting the cutting-tools. Fig. 3 is a section on line *x x* of Fig. 1. Fig. 4 is a top plan view of the machine with the flask removed. Fig. 5 is an isometric view of the tool-carrier D shown in Fig. 2ª. Fig. 6 is a top plan view thereof and of the carrier-arm E. Figs. 7 and 8 are sections of the coring-tools, drawn to an enlarged scale, the cutting-tool being shown as secured to its supporting-arm.

The invention relates to machines for molding wheels and pulleys, and is designed to effect a very material reduction in the expense of producing the molds for such wheels or pulleys.

In the molding of wheels or pulleys as ordinarily conducted the mold for each wheel or pulley differing either in diameter or simply in the width of the face is made from a separate pattern, large numbers of such being therefore required, involving great expenditure of manufacture and large storage-rooms. It has heretofore been proposed to effect a saving of these expenditures by providing means for molding wheels or pulleys of a uniform diameter, but of any desired width of face, the pattern for the rim consisting of a vertically-adjustable cylinder encompassing a disk-pattern for one-half of the hub and spokes or radial arms of the wheel, so that a single cylindrical pattern and a single disk-pattern will answer for the purpose of molding wheels or pulleys of any desired width of face within the limits of said cylindrical pattern. My invention is designed not only to accomplish this, but to effect a further saving in the expense of making and storing patterns by providing means whereby molds for wheels of any desired diameter and any desired width of face within the limits of the machine may be produced.

My invention is further designed to produce a machine by which accurate work may be done and a well-finished mold obtained whereby the labor of truing the face of the pulleys by the usual method of turning in a lathe may be dispensed with and the truing effected by the more expeditious mode of grinding; and to these ends the invention consists in the combination, with a slotted molding-table and a removable disk-pattern for one-half of the hub and radial arms of the pulley or wheel, arranged axially of the table, of one or more revoluble coring-tools for coring out the rim of the wheel or pulley; in the combination, with the molding-table of a revoluble cutter-tool or tools and a smoothing and compacting tool or tools, of means for adjusting the tools relatively to the diameter of the mold for the wheel or pulley; in means for adjusting the cutting-tool relatively to the smoothing and compacting tools, and in other structural features and combinations of parts substantially as hereinafter described, and as set forth in the claims.

The machine or apparatus consists, essentially, of a molding-table, which, in order to adapt it to various sizes of pulleys or wheels, must necessarily be adjustable; and to this end said table is composed of an outer fixed ring R, an axially-arranged and removable disk-pattern D, having one-half of the hub and one-half of the spokes or radial arms of the wheel or pulley formed thereon, and a revoluble intermediate ring R', the inner diameter of which is greater than the diameter of the disk-pattern, so as to form between the two an annular space or slot *r'*, for the passage and operation of a cutting tool or tools K, or such a tool or tools and a smoothing or finishing and compacting tool or tools K'.

The machine or apparatus further consists of devices for imparting a compound rotary and vertical motion to said tools, of appliances for centering the flask on the table, and of means for gaging the extent of upward movement of the tools, according to the width of face of the pulley, and for limiting such upward motion.

I would here state that inasmuch as the cutting as well as the finishing or smoothing and compacting tool or tools are adjustable on and detachable from the tool-carrier the means for gaging and limiting the upward motion of said tools may be dispensed with by employing interchangeable tools the length of which is suited to half the width of the face of the wheel or pulley to be molded.

The outer fixed ring R is supported on pillars or columns $c$, secured to a bed-plate B, and said ring has an interior annular flange $r$, Figs. 2 and $2^a$, that forms a seat for an intermediate ring R', whose inner diameter is equal to the outer or greatest diameter of the wheel or pulley to be cast.

From the bed-plate B rises a standard S, that has an axial socket $s$ formed in its upper end for the reception of the foot $d$ of the disk-pattern D for one-half of the hub and one-half of the radial arms or spokes of the wheel or pulley, the diameter of which disk is equal to that of the inner diameter of the rim of the wheel or pulley to be cast, so that when said pattern is centered on the standard there will be an annular space or opening $r'$ between it and the intermediate ring R', the width of which is equal to the thickness of the rim of the wheel or pulley to be cast. These parts—namely, the fixed ring R, interchangeable intermediate ring R', and interchangeable disk-pattern D—are arranged with their upper faces or surfaces in the same plane, (excepting, of course, those parts of the pattern that project beyond the face thereof,) and constitute, in fact, the molding-table. The socket $s$ in the standard S is preferably made polygonal in cross-section and tapering downwardly, the foot $d$ of the pattern D being correspondingly shaped to prevent accidental displacement of the pattern on and to facilitate its removal from the said standard S. The ring R' and pattern D being removably seated on their bearings, others of different dimensions may be substituted, so that these parts become interchangeable to adapt the machine for the molding of wheels or pulleys differing in diameter and in the thickness and width of rim and hub, &c.

Upon the standard S is mounted a sleeve S', of increased diameter at its lower end, to form a seat-flange or collar $s'$, that is provided with trunnions or journals $s^2$ on opposite sides, to which is pivoted one end of the links $l^3$, the other ends of which links are pivoted to the fork $l$ of a two-armed lever L, fulcrumed at $l'$, between two standards $s^3\ s^3$, secured to the bed-plate B and outer ring R of the molding-table, respectively. The arm $l^2$ of lever L is a toothed sector that meshes with a pinion P on an arbor A, that has its bearings in said standards $s^3$ and carries a ratchet-wheel W, with which engages a pawl $p$, both ratchet and pinion being rigidly secured to arbor A, which may be driven by steam or like power and will then carry a suitable belt; or it may be rotated by hand, and is then provided with a crank, or the ratchet-wheel W may serve as a crank-wheel, as shown.

It is obvious that when the arbor A is rotated in the proper direction the sleeve S' will be moved up or down on the standard S, as the case may be, and to prevent any tendency to rotation said standard may have a polygonal form in cross-section, or the sleeve may be held against rotation by a feather $s^4$, as shown.

On the seat-flange $s'$ rests a belt-pulley P', that is loosely mounted on the sleeve S', and carries a tool-carrier in the form of a disk D', to which is secured the cutter or cutters K, or such cutter or cutters and one or more finishing-tools K', said pulley and disk revolving freely on said sleeve and at the same time partaking of its vertical motion to feed the tools to the flask F and withdraw the same therefrom. The tool-carrier D' has radial slots $d'$, in which the tools K and K' are adjustably and removably secured.

I have hereinbefore stated that the pulley P' and tool-carrier D are loosely mounted on a sleeve S'. This is not absolutely necessary, as they may be so mounted on the standard itself and made to rest on a loose collar $S^2$, connected with the lever L, as described, and as shown in Fig. $2^a$, in which case such collar is or may be held against rotation by the forked lever L alone.

The operation of the machine may be briefly described, as follows: A ring R' and disk-pattern D, being placed in position on the ring R and standard S, respectively, as described, a flask F is centered on the ring R in any convenient manner—as, for instance, by centering bolts or rods arranged radially on the ring R and sliding in suitable bearings in which they are adjusted by means of set bolts or screws—or centering-screws $S^3$ may be employed that work in suitable bearings $b$, formed on ring R, as shown, or any other suitable centering devices or means for centering the flask may be adopted. Sand is then rammed or packed into the flask in the usual manner, and when this operation is completed the tool-carrier D' is revolved and at the same time moved upward, so that the cutting tool or tools K, or such tools and the finishing-tool K', will pass between the disk D and ring R' and core out an annular space for one-half of the rim of the pulley or wheel.

In practice I have found it of great advantage to use a finishing or smoothing and packing tool K' in conjunction with the cutting-tool K, and in order that the work of cutting, packing, and smoothing the core for the rim may be properly effected I preferably so arrange the tools as that the operation of cutting and finishing will succeed each other. To this end it is necessary that the cutter-tools should be adjustable vertically independently of the vertical motion of the tool-carriers; and for this purpose said carrier is provided with a segmental shoulder $D^2$, gradually increasing in height from its initial point $d^2$, which is flush with the face of the carrier. In other words, the carrier has a cam-face $D^2$, and the cutting-tool is secured to a radial arm E, loosely mounted on the standard S, so that on revolving said arm in the direction of the rise of the cam-face the cutter-tool will be raised and the work of cutting will precede the work of finishing. In this manner any desired depth within the limits of elevation of the cam-face can be cut out of the sand in advance of the work of finishing. The arm E has its outer end bent at right angles, as shown at $e$, and embraces the periphery of the carrier $D'$, and when the cutter is properly adjusted said arm is locked into position by means of a set-bolt $e'$ or in any other desired manner.

In order to ascertain the degree of penetration of the tools K and $K'$ into the sand in the flask, and thereby gage the width of the rim of the wheel, the standard S may be graduated to inches and fractions, as shown at $s^6$, Fig. 1. To finish or smooth the bottom of the annular core, the arm is revolved to move the cutting-tools off the shoulders or cam-faces $D^2$, thus lowering the same and permitting the finishing-tool to smooth the bottom of the core. The operation of coring being completed, the tool-carrier $D'$ is caused to move in a reverse direction to withdraw the cutting and smoothing tools K $K'$ from the flask, when the operation of molding a half pulley or wheel is completed, which operation is repeated with a second flask, and the two flasks are then united for casting in the ordinary manner.

The cutter K is so shaped as to cut a circular channel out of the sand in the flask, and to this end such tool has preferably the form of a segment of the circle traced by it, and it is preferably provided with a vertical cutting-edge $c^4$, while the opposite vertical edges are slightly rounded off to leave perfectly smooth surfaces, whatever may be the direction of motion of the cutter-tool.

The finishing or smoothing and compacting tool is preferably also a segment of the circle traced by it, the thickness thereof increasing from the vertical edges to the center, as shown more clearly in Fig. 8.

In practice I prefer to make the cutter K of a thickness slightly less than that of the rim of the wheel or pulley to be cast, while the greatest thickness of the finishing or smoothing and compacting tool $K'$ will be equal to that of the rim of the pulley or wheel to be cast for obvious purposes.

If more than one cutter and one finishing-tool are employed, they may be secured to the carrier in alternate order—namely, a cutter, then a finishing-tool, again a cutter and a finishing tool, though this is not absolutely necessary.

Inasmuch as it is difficult to watch the upward motion of the tool-carrier, I prefer to provide means for limiting such motion independently of the attention of the operator. To this end the standard S has or may have a series of superposed holes formed therein for the reception of a stop pin or screw that may be adjusted vertically to the height the tool-carrier $D'$ is to travel; or a collar $c'$ may be employed for this purpose, as shown in Fig. 1, said collar being secured or adjusted in position by means of a set-screw $c^2$.

The advantages of the described machine will be readily understood by those conversant with this branch of the arts.

Having described my invention, what I claim, and desire to secure by Letters Patent, is—

1. In a machine for molding pulleys or wheels, the combination, with a molding-table for supporting the flask, in which table is formed an annular slot, of one or more coring-tools revoluble in said slot, substantially as and for the purposes specified.

2. In a machine for molding pulleys or wheels, the combination, with a molding-table for supporting the flask, in which table is formed an annular slot, of one or more vertically-movable coring-tools revoluble in said slot, substantially as and for the purposes specified.

3. In a machine for molding pulleys or wheels, the combination, with a molding-table for supporting the flask, in which table is formed an annular slot, of one or more cutting-tools and a smoothing and compacting tool revoluble in said slot, substantially as and for the purposes specified.

4. In a machine for molding pulleys or wheels, the combination, with the molding-table for supporting the flask, in which table is formed an annular slot, of one or more cutting-tools and one or more smoothing and compacting tools of greater thickness than the coring tool or tools, substantially as and for the purposes specified.

5. In a machine for molding pulleys or wheels, the combination, with the molding-table for supporting the flask, in which table is formed an annular slot, of one or more revoluble cutting-tools provided with a vertical cutting-edge, and one or more smoothing and compacting tools tapering from the vertical edges toward the center and of greater thickness at that point than the thickness of the coring tool or tools, substantially as and for the purposes specified.

6. In a machine for molding pulleys or wheels, the combination, with the molding-table for supporting the flask, in which table is formed an annular slot, of a revoluble and vertically-movable tool-carrier, a smoothing and compacting tool, and one or more cutter-tools secured to the carrier, said cutter-tools being adjustable vertically on the carrier relatively to the smoothing and compacting tool, substantially as and for the purposes specified.

7. In a machine for molding pulleys or wheels, a molding-table comprising an outer ring, a disk-pattern having formed thereon one-half of the hub and spokes or radial arms of a wheel or pulley centrally placed in said ring, and an intermediate ring, the inner diameter of which is greater than the diameter of the disk-pattern, whereby an annular slot is formed between the two, in combination with a revoluble coring tool or tools working in said slot, substantially as and for the purposes specified.

8. In a machine for molding pulleys or wheels, a molding-table comprising an outer ring, a disk-pattern centrally placed in said ring and having formed thereon one-half of the hub and spokes or radial arms of a wheel or pulley, and an intermediate ring supported from the outer ring, the inner diameter of which intermediate ring is greater than the diameter of the disk-pattern, to form an annular slot between the two, in combination with one or more revoluble and vertically-movable coring-tools adapted to work in said annular slot, substantially as and for the purposes specified.

9. In a machine for molding pulleys or wheels, a molding-table comprising an outer ring, an axial standard, a disk-pattern detachably connected thereto, and an intermediate ring detachably connected with the outer ring, the inner diameter of which intermediate ring is greater than that of the disk-pattern, in combination with a revoluble tool or tools adapted to move vertically on the axial standard and operate through the annular slot formed between the disk-pattern and the intermediate ring, substantially as and for the purposes specified.

10. In a machine for molding pulleys or wheels, a molding-table comprising an outer ring, centering devices supported from said ring for centering the flask, a standard arranged axially of the ring, a disk-pattern detachably connected with the standard and an intermediate ring detachably connected with the outer ring, the inner diameter of which intermediate ring is greater than that of the disk-pattern, in combination with a tool-carrier adapted to rotate and move vertically on the standard, and coring-tools adjustably connected with said carrier, substantially as and for the purposes specified.

11. In a machine for molding pulleys or wheels, the combination, with the stationary molding-table provided with an annular slot and a revoluble and vertically-movable tool-carrier, the tool or tools of which are adapted to penetrate into and through said slot, of an index for indicating the extent of vertical motion of the tool-carrier, substantially as and for the purposes specified.

12. In a machine for molding pulleys or wheels, the combination, with the stationary molding-table provided with an annular slot and a revoluble and vertically-movable tool-carrier, the tool or tools of which are adapted to penetrate into and through said slot, of a stop or abutment for limiting the upward motion of the tool-carrier, substantially as and for the purposes specified.

13. In a machine for molding pulleys or wheels, the combination, with the stationary molding-table provided with an annular slot and a revoluble and vertically-movable tool-carrier, the tool or tools of which are adapted to penetrate into and through said slot, of a vertically-adjustable stop or abutment for limiting the upward motion of the tool-carrier, substantially as and for the purposes specified.

14. The combination, with the slotted molding-table, the standard S, and the revoluble and vertically-movable tool-carrier provided with a segmental cam-face $D^2$, of the arm E, loosely mounted on the standard, and a coring-tool secured to said arm, substantially as and for the purposes specified.

15. In a molding-machine, a molding-table consisting of an outer fixed ring, a disk-pattern arranged axially of said ring, a support for and with which said pattern is detachably connected, and an intermediate removable ring, the inner diameter of which is greater than the diameter of the disk-pattern, in combination with a revoluble and vertically-movable tool-carrier, and a coring tool or tools detachably connected with and adjustable in radial lines on said tool-carrier, substantially as and for the purposes specified.

In testimony whereof I affix my signature in presence of two witnesses.

ALEXANDER DELANEY.

Witnesses:
HENRY ORTH,
J. THOMSON CROSS.